United States Patent [19]
Rönisch

[11] Patent Number: 6,002,565
[45] Date of Patent: Dec. 14, 1999

[54] FAULT CURRENT SAFETY SWITCH

[75] Inventor: Arthur Rönisch, Kierspe, Germany

[73] Assignee: Werner Turck GmbH & Co. KG, Halver, Germany

[21] Appl. No.: 09/033,454

[22] Filed: Mar. 2, 1998

[51] Int. Cl.[6] .................................................. H02H 3/00
[52] U.S. Cl. .......................................... 361/93.1; 361/189
[58] Field of Search ................................... 361/42–50, 56, 361/93, 189, 190, 93.1, 93.6; 307/125, 130, 131, 132 E, 132 M, 134; 324/418, 422, 424, 527, 179, 180, 117 H, 127

[56] References Cited

U.S. PATENT DOCUMENTS 4,742,422  5/1988  Tigges ........................................ 361/45

FOREIGN PATENT DOCUMENTS

| 3537140 | 4/1987 | Germany | H02H 3/16 |
| 4340737 | 6/1995 | Germany | H02H 3/33 |
| 4343560 | 6/1995 | Germany | H02H 3/16 |
| 4406496 | 8/1995 | Germany | H02H 3/16 |

*Primary Examiner*—Ronald W. Leja
*Attorney, Agent, or Firm*—Martin A. Farber

[57] ABSTRACT

A fault current switch with a total current converter (W), whose primary circuit (1) consists of the incoming and outgoing lines of the circuit to be monitored, and whose secondary winding (2) is connected with a test circuit (P), with an electromagnetic switching device (H) for shutting off the circuit to be monitored if a fault current appears, with the working current of the holding device (H) being switchable by a switch (S1) that is supplied for the purpose with a control signal by test circuit (P), and with a power supply (EV1) for the test circuit (P) and the switch (S1). In order to make such a fault current switch both less prone to wear and also more functionally reliable, a second switch (S2) is connected in parallel with the first switch (S1), likewise for switching a working current of the switching device (H), the second switch (S2) being energized by the test circuit (P) with a second control signal that differs from the first control signal.

16 Claims, 2 Drawing Sheets

FAULT CURRENT SAFETY SWITCH

FIELD AND BACKGROUND OF THE INVENTION

The invention relates to a fault current safety switch.

A fault current safety switch is known from German publication 35 37 140. Fault current safety switches are also known from German OS 4 343 560 and German OS 4 340 737. Fault current safety switches are used in electrical systems to monitor insulation, to protect against fire caused by short circuits to ground, and to protect persons against electrical shock. The term "fault current" is defined as an electrical current that flows along unintended paths as the result of an insulation failure. The value of a fault current of this kind is determined by the difference between the value of the current that flows into the system through the normal incoming and outgoing lines and the value of the current that flows out of the system. If the difference between the two currents is not zero, a fault current will flow along a path that is not the regular path. The purpose of the fault current safety switch is to separate completely the system part to be monitored from the power supply if the fault current exceeds a predetermined value. As far as the other features of a fault current safety switch according to the spaces are concerned, reference is made to the remarks in German Patent 35 37 140, where a test circuit is provided to which the secondary circuit of a total current converter is connected. The primary circuit of the total current converter is formed by the incoming and outgoing lines, so that a total current that corresponds to the difference between the currents in the incoming and outgoing lines is induced in the secondary winding. The test circuit acts on a solenoid through a switch designed as a transistor in the known fault current switch. In the prior art, the solenoid is constantly traversed by current so that it operates according to the resting current principle. When a fault current appears, current ceases to flow through the solenoid. The electromagnetic switch then assumes the open position and interrupts the circuit to be monitored. The test circuit and switch are supplied with current by a common power supply. The energy is taken directly from the circuit to be monitored.

SUMMARY OF THE INVENTION

It is an object of the invention to improve on such a fault current safety switch to make it less prone to wear and to make it more reliable in its function.

According to the invention, a second switch is provided in parallel with the first switch. Each switch is exposed to a control signal by the test circuit. Both switches act on the electronic switching device. It is sufficient for one of the two switches to throw in order to move the electronic switching device into the open position to interrupt the circuit to be monitored. If one of the two switches is wired as an inverter for the other, the test circuit must deliver two essentially complementary control signals in order to actuate or not actuate the switches. The second, inverting switch is preferably provided with a separate power supply. The high redundancy provided by the invention ensures that the fault current safety switch will drop out only in the event of a highly unlikely double fault, thus providing high operating safety. Preferably, the electromagnetic switching device is closed when there is no working current. The preferred circuit operates using the working current principle. The coil of the solenoid is traversed by current only when a fault current appears. As a result of a circuit characteristic of the second switch and its separate power supply that is complementary to the first, failure of the first power supply or failure of the test circuit causes the second switch to close and the winding of the solenoid to be energized. In addition, a design is preferred in which the electromagnetic circuit has two separate windings. A first winding is energized by the first switch. A second winding is energized by the second switch. Such a further increase in redundancy of the device ensures that even if a wire should break in a winding of the solenoid, the proper functional reliability of the entire device will not be adversely affected. The test circuit is preferably designed as a microprocessor. A microprogram can run in it that can also perform additional monitoring tasks. For example, a second secondary winding can be provided for the total current converter that is supplied with test signals by the test circuit. These test signals are then returned by the second secondary winding of the total current converter to the test circuit and evaluated there. The regular emission of test signals means the functional ability of the total current converter can be checked constantly. If an error occurs, it can either be indicated or can trigger the fault current function. Provision can also be made to hold the second switch in the open position by a negative voltage and to close it if this voltage disappears. The negative voltage is preferably supplied dynamically, i.e. in pulses. The second switch can include a condenser for this purpose, which is negatively charged by the pulses supplied. If the pulses disappear, the capacitor discharges a discharge current, through a diode for example, until the second switch opens. The opening current is then provided by the second separate power supply. Designing the test circuit as a microprocessor also has the advantage that a variety of testing tasks can be handled by the various high-ohmage inputs of the microprocessor. Preferably, each high-ohmage input of the microprocessor is connected through resistances possibly connected upstream with a winding of the electronic switching device in order to monitor the latter permanently for wire breaks. Advantageously, the microprocessor has another output by which the microprocessor can be connected to an external bus or the like. The signal generated by the first secondary winding of the total current converter is fed through an amplifier to an analog input of the microprocessor. The amplifier can also be integrated into the microprocessor. In another preferred embodiment, the electromagnetic control device has a power supply of its own. In this case also, the current is tapped from the line to which the circuit to be monitored is connected. The voltage is preferably stepped down by resistors.

BRIEF DESCRIPTION OF THE DRAWINGS

With the above and other objects and other advantages in view, the present invention will become more clearly understood in connection with the detailed description of a preferred embodiment, when considered with the accompanying drawings of which.

DETAILED DESCRIPTION OF THE PREFERRED EMBODIMENT

Figure 1:
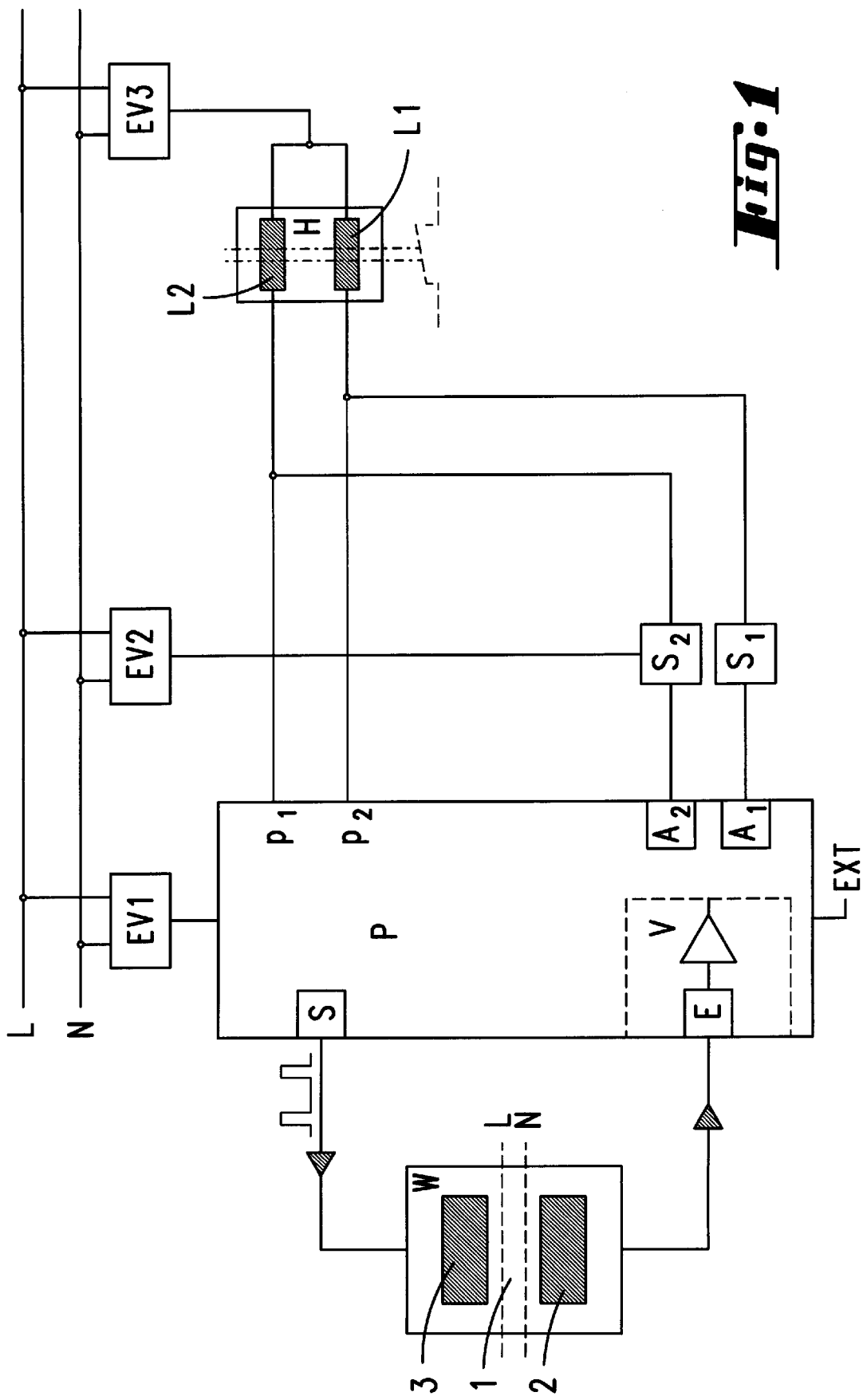
FIG. 1 is a block diagram of a fault current safety switch according to the invention.
Figure 2:
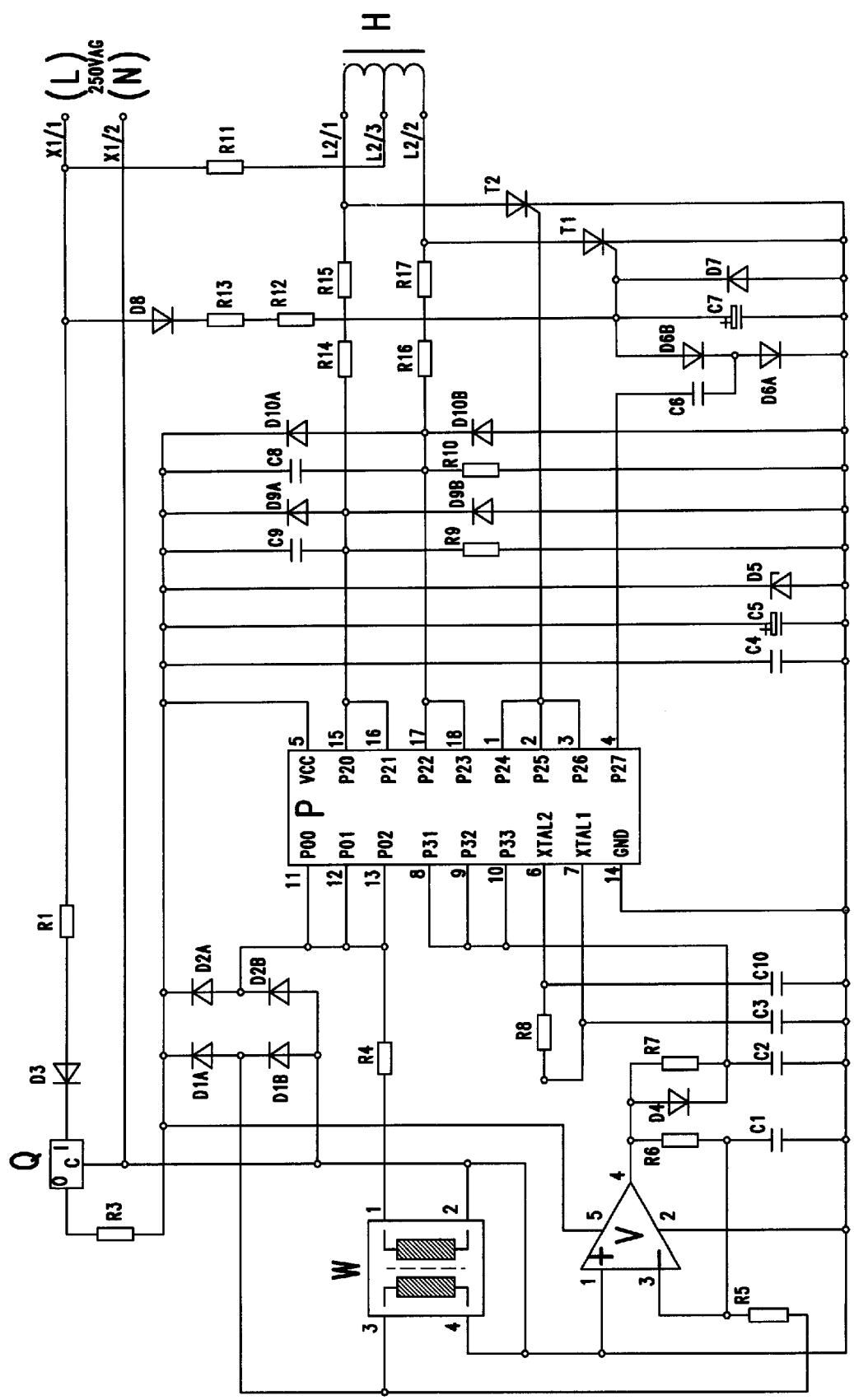
FIG. 2 is a sample circuit of a fault current safety switch according to the invention.

The fault current safety switch sketched in FIG. 1 has a test circuit P formed by a microprocessor. FIG. 2 shows how a microprocessor of this kind is supplied with current and how the terminals are connected. The device also has a total current converter W with a primary winding 1 and two secondary windings 2, 3. The primary winding 1 consists essentially of the incoming and outgoing lines that pass through the annular core or the like of the circuit L, N to be monitored. The first secondary winding 2 is connected through an amplifier V with an input of the microprocessor. In the block diagram according to FIG. 1, the input is marked E. The amplifier V is integrated into microprocessor P.

From the microprocessor P, test pulses are emitted through the output S, for example through the resistor R4, said pulses simulating a fault current. These test signals are transmitted from the second secondary winding 3 to the first secondary winding 2 and received by the input E of the microprocessor. From the time correlation to the transmitter S, the microprocessor determines whether the signals it has received are test signals or whether these signals are genuine fault current signals.

The signal output S is formed by the pin 13 in the circuit in FIG. 2. The input E is formed by the pins 8 to 10. An RC element, formed by the capacitors C3 and C10 and the resistor R8, supplies the microprocessor with a clock signal through the pins 6 and 7.

The microprocessor P receives its supply voltage from power supply EV1. In the embodiment shown in FIG. 2, the first power supply marked Q is a voltage regulator that is connected through resistors to the circuit to be monitored. A switch S1 is also supplied with current by this power supply EV1. This switch S1 is formed by the thyristor T2. The thyristor T2 has its gate connected to the microprocessor pins 1, 2, and 3. In the block diagram according to FIG. 1, the corresponding output of the microprocessor is marked A1. The output of the switch S1 is connected with the winding L1 of a solenoid. The solenoid itself is supplied with current by a power supply EV3. In the embodiment shown in FIG. 2, this third power supply consists of the resistor R11 which is connected directly to the circuit to be monitored.

The microprocessor P has a second output A2, from which a signal emerges that is essentially the inverse of the signal from the first output A1. In the embodiment, these are pulses. These pulses are fed to a switch S2. The switch S2 in the embodiment is formed by a transistor T1. The output A2 is formed by the pin 4 of the microprocessor. The pulses from the pin 4 pass through a capacitor C6 into a series of diodes D6a, D6b. By means of these diodes, a negative current is generated from the pulsating signal that flows into C7. At the same time, a positive current is applied to C7. This positive current is derived from the circuit to be monitored by using D8/R13/R12. In the stable state, a current equilibrium is established so that the voltage at C7 is much smaller than the triggering voltage of T1. If there are no pulses, no negative current is produced, the current equilibrium is interrupted, and thyristor T1 switches, so that current can flow through the second winding L2 of the solenoid.

Switch S2 has a power supply EV2 of its own that is formed by resistors R13 and R12 in conjunction with the diode 8.

Because of the diode D7 connected in parallel with the capacitor C7, capacitor C7 is protected against a charge of opposite polarity being too high when control signals are applied. This allows electrolytic capacitors to be used.

The outputs of windings L1 and L2 which are connected on one side and linked to the third power supply EV3 are connected on the other side through the resistors R14, R15, and R16, R17 with the pins 15, 16, and 17, 18 of the microprocessor. In the block diagram, this is indicated by the connection of the windings L1, L2 with the test inputs p1 and p2 of the microprocessor. The test inputs p1 and p2 are high-ohmage inputs of the microprocessor. These inputs are used to test whether a low test current can flow through windings L1 and L2, if this is not the case, the microprocessor detects a wire break. It can emit an appropriate signal through a signal output device, through a buzzer or an LED for example. However, it can also perform a fault current function with the other winding in order to interrupt the circuit.

The fault current safety switch operates as follows. The microprocessor is supplied with current by the power supply EV1. An operating voltage is applied to second switch S2 through the second power supply EV2. A voltage is applied to the two windings L1 and L2 of the solenoid through the third power supply EV3. The switches S1 and S2 that are connected to the other ends of the respective windings L1 and L2 act as blocks in the error-free state so that no current flows through windings L1 and L2 and the circuit to be monitored is closed. In this state, no signal is applied to output A1 of the microprocessor, so that the thyristor T2 that forms the switch S1 is blocked. Negative voltage pulses are emitted from the output A2 which ensure that the switch S2 is likewise blocked. The state of the windings L1 and L2 is checked through the test inputs p1, p2.

Test pulses are emitted at intervals from the output S to the second primary winding of the total current converter W by the microprocessor P. These pulses are transmitted through the first secondary winding 2 to an input E of the microprocessor. The microprocessor continuously monitors the functional ability of the solenoid and the total current converter. If the microprocessor P detects a fault current signal, a control signal is applied to the output A1 so that the switch S1 closes and a current can flow from the power supply 3 through the winding L1. At the same time, the control signal applied to the output A2 becomes positive or is interrupted so that the switch 2 is likewise closed by means of the power supply EV2, and current can also flow through winding L2. In this triggering case, the thyristors T1, T2 close so that current can flow through the windings L1, L2. As a result the armature of the solenoid is lifted so that the circuit to be monitored is interrupted. The solenoid is located downstream in the circuit to the taps for the power supply, so that the power to the fault current switch is maintained even when the switching device is open. In addition, the solenoid can also be designed so that it remains in the open position after being actuated and can be returned to the closed position only by moving it by hand.

The microprocessor normally monitors the total current converter circuit by means of pulses. The fault current safety switch is immune to power failures. After a power failure, the fault current safety switch automatically drops into the state in which it closes the circuit to be monitored. Despite the working current principle, operating reliability is high. The circuit to be monitored is closed only when two different control signals, for example a zero voltage and a positive or negative voltage, are supplied by the test circuit. A switch can have the switching characteristic of an NO switch, while the other, which has a separate power supply, then has the switching characteristics of an NC switch.

I claim:

1. Fault current switch with a total current converter comprising:

a test circuit, an electromagnetic switching device, a first switch, and a second switch;

wherein the converter comprises a primary circuit having incoming and outgoing lines of a circuit to be monitored, and a secondary winding connected with the test circuit;

the electromagnetic switching device is operative to shut off the circuit to be monitored if a fault current appears, a working current of the switching device (H) being switchable by the first switch upon application of a first control signal to the first switch by the test circuit, and wherein the first switch is provided with a first power supply;

the test circuit and the first switch are connected for energization by the first power supply;

each of the first switch and the second switch is connected to the electromagnetic switching device for switching the working current to the switching device; and said second switch is subjected by the test circuit to a second control signal that differs from the first control signal applied by the test circuit to the first switch.

2. Fault current switch according to claim 1, wherein the second switch has a switching characteristic that is complementary to that of the first switch.

3. Fault current switch according to claim 2 wherein the second switch has a second power supply separate from the first power supply and dedicated to the second switch.

4. Fault current switch according to claim 1, wherein the second switch closes when the second control signal is absent, and has a connection to the test circuit enabling energization by a second power supply.

5. Fault current switch according to claim 1, wherein the electromagnetic switching device is closed when the working current is absent.

6. Fault current switch according to claim 1, wherein the electromagnetic switching device is a solenoid with two separate windings, which can be supplied with working current by either one of the first and the second switches.

7. Fault current switch according to claim 6, wherein the windings of the solenoid are monitored by the test circuit for wire breaks.

8. Fault current switch according to claim 6, further comprising another power supply for supplying the solenoid of the electromagnetic switching device with current.

9. Fault current switch according to claim 6, wherein both of the windings (L1, L2) of the solenoid (H) are energized when a fault current appears.

10. fault current switch according to claim 1, wherein the test circuit (p) comprises a microprocessor.

11. Fault current switch according to claim 10, further comprising an amplifier (V) integrated into the microprocessor.

12. Fault current switch according to claim 1, wherein the total current converter is operative for monitoring by means of test signals supplied to the second secondary winding, the test signals being generated by the test circuit.

13. Fault current switch according to claim 1, wherein the second switch is held in its open position by means of a negative voltage and closes when this voltage is absent.

14. Fault current switch according to claim 1, wherein the second switch (S2) comprises a dynamically controlled capacitor (C2).

15. Fault current switch according to claim 1, further comprising an external test connection (EXT) of the test circuit (P).

16. Fault current switch according to claim 1, wherein the first and the second switches are thyristors.

* * * * *